(12) United States Patent
Lairsey et al.

(10) Patent No.: US 11,165,655 B1
(45) Date of Patent: Nov. 2, 2021

(54) SYSTEM FOR OPTIMIZING ENTERPRISE NETWORK RELATIONS

(71) Applicant: Dell Products L.P., Round Rock, TX (US)

(72) Inventors: Jeffrey M. Lairsey, Round Rock, TX (US); Saurav Shrestha, Round Rock, TX (US); Carlin Mendonca, Austin, TX (US); Margaret Patton, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/208,758

(22) Filed: Mar. 22, 2021

(51) Int. Cl.
*G06F 15/173* (2006.01)
*H04L 12/24* (2006.01)

(52) U.S. Cl.
CPC .............. *H04L 41/12* (2013.01); *H04L 41/14* (2013.01)

(58) Field of Classification Search
CPC ................................ H04L 41/12; H04L 41/14
See application file for complete search history.

(56) References Cited

U.S. PATENT DOCUMENTS

| | | | | |
|---|---|---|---|---|
| 2011/0160987 A1* | 6/2011 | Wu | ...................... | G08G 1/0104 701/117 |
| 2020/0169509 A1* | 5/2020 | Tigli | ..................... | H04L 41/147 |

OTHER PUBLICATIONS

Brittany Herr et al., Analyzing distributed trace data, Pinterest Engineering Blog, Sep. 29, 2017, https://medium.com/pinterest-engineering/analyzing-distributed-trace-data-6aae58919949.

* cited by examiner

*Primary Examiner* — Thanh T Nguyen
(74) *Attorney, Agent, or Firm* — Terrile, Cannatti & Chambers; Stephen A. Terrile

(57) ABSTRACT

A system, method, and computer-readable medium for performing a data center monitoring and management operation. The data center monitoring and management operation includes: identifying a data center asset topology for a data center; creating a data center topology map; monitoring asset traffic within the data center, the monitoring providing data center asset traffic data; presenting the data center topology map within data center topology user interface; presenting an efficiency improvement suggestion associated with the asset traffic within the data center; and, changing the data center asset topology based upon the efficiency improvement suggestion.

20 Claims, 7 Drawing Sheets

SYSTEM FOR OPTIMIZING ENTERPRISE NETWORK RELATIONS

BACKGROUND OF THE INVENTION

Field of the Invention

The present invention relates to information handling systems. More specifically, embodiments of the invention relate to performing a data center system monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center monitoring and management operation, comprising: identifying a data center asset topology for a data center; creating a data center topology map; monitoring asset traffic within the data center, the monitoring providing data center asset traffic data; presenting the data center topology map within data center topology user interface; presenting an efficiency improvement suggestion associated with the asset traffic within the data center; and, changing the data center asset topology based upon the efficiency improvement suggestion.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: identifying a data center asset topology for a data center; creating a data center topology map; monitoring asset traffic within the data center, the monitoring providing data center asset traffic data; presenting the data center topology map within data center topology user interface; presenting an efficiency improvement suggestion associated with the asset traffic within the data center; and, changing the data center asset topology based upon the efficiency improvement suggestion.

In another embodiment the invention relates to a computer-readable storage medium embodying computer program code, the computer program code comprising computer executable instructions configured for: identifying a data center asset topology for a data center; creating a data center topology map; monitoring asset traffic within the data center, the monitoring providing data center asset traffic data; presenting the data center topology map within data center topology user interface; presenting an efficiency improvement suggestion associated with the asset traffic within the data center; and, changing the data center asset topology based upon the efficiency improvement suggestion.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
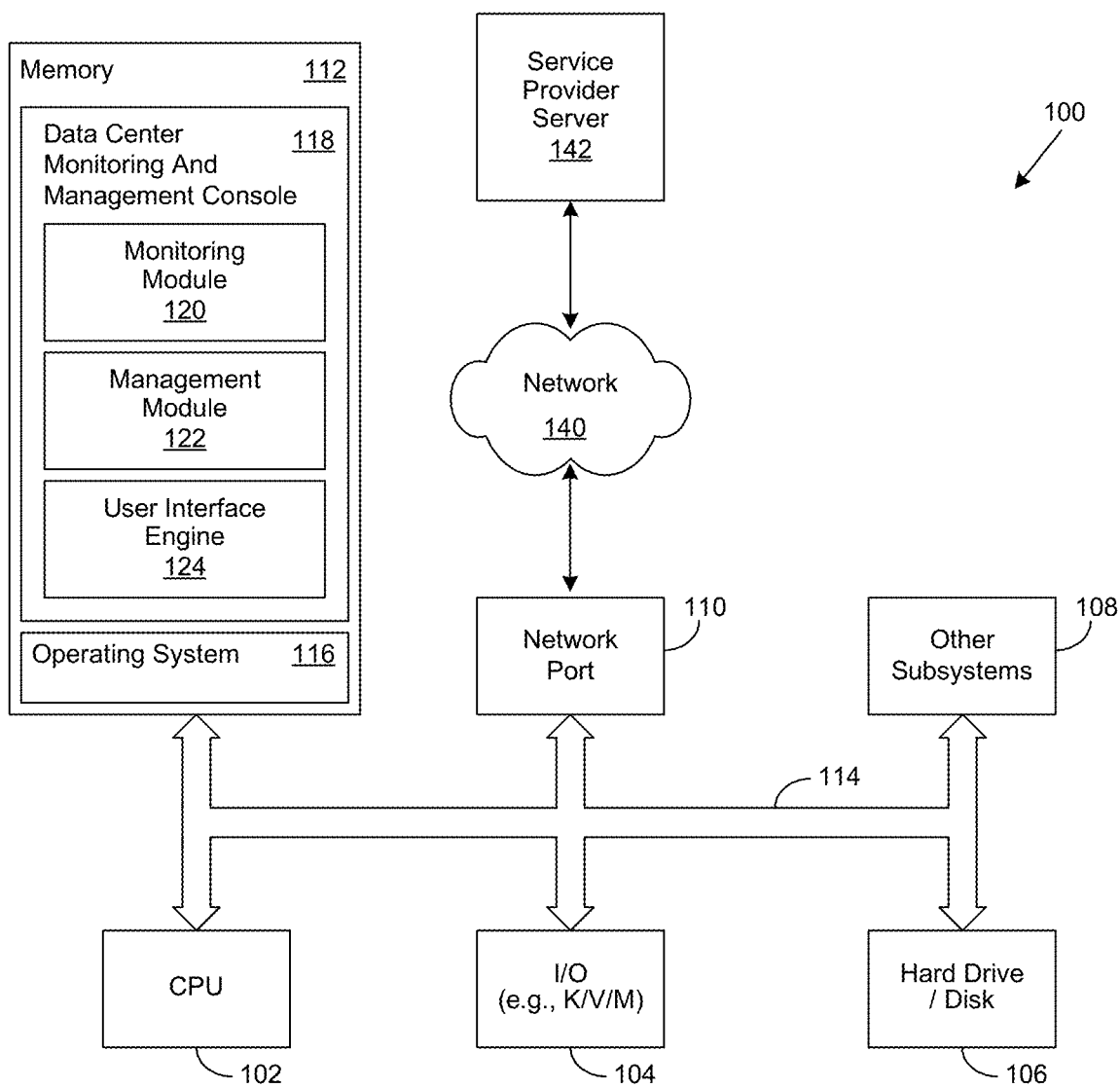
FIG. 1 shows a general illustration of components of an information handling system as implemented in the system and method of the present invention.

A system, method, and computer-readable medium are disclosed for performing a data center system monitoring and management operation. Various aspects of the invention reflect an appreciation that it is common for a typical datacenter to monitor and manage many different assets, such as certain computing and networking devices, described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads. Accordingly, various aspects of the invention reflect an appreciation that efficient and effective monitoring and management of certain data center assets may assist in optimizing the availability, performance, and reliability of the services offered by a data center.

Various aspects of the invention reflect an appreciation that it is not uncommon for data centers to have large clusters of certain data center assets, such as servers, storage devices, network switches, and so forth. Various aspects of the invention likewise reflect an appreciation that certain such data center assets may be connected to one another via a physical network connection, such as connections to a Local Area Network (LAN) or a Storage area Network (SAN). Likewise, various aspects of the invention reflect an appreciation that clusters of such data center assets may be housed in a common enclosure, such as an equipment rack, or in two or more separate enclosures, or a combination thereof. Furthermore, certain aspects of the invention reflect an appreciation that such enclosures may be collocated or distributed, localized or remote to one another, or a combination thereof. Various aspects of the invention likewise reflect that certain individual, or clusters of, data center assets may be logically grouped to appear, and act, as a single system or component of a data center environment.

Certain aspects of the invention likewise reflect an appreciation that the topology of such data center assets tends to evolve over time as additional assets are added, removed, replaced, or upgraded, and associated network connections are added, removed, upgraded, or rerouted. For example, racks of new servers may be implemented, or older servers may be upgraded, or faulty servers may be replaced. Likewise, network routers and switches may be upgraded to support higher speeds or newer protocols, and SANs may be expanded, reconfigured, or re-mapped to other data center components. Furthermore, the performance, efficiency, or availability of individual data center assets, and their associated network connections, may degrade over time.

Various aspects of the invention reflect an appreciation that workload assignments to certain data center assets, and their associated components, may likewise evolve over time. For example, four workloads, each providing a particular cloud service, may be assigned to a first server, while an associated database maybe be implemented to be hosted on an adjacent, second server in the same equipment rack. In this example, the proximity of the two servers reduces network latency whenever one of the workloads on the first server accesses the database on the second server. To continue the example, two of the workloads may be migrated to a third server, located elsewhere in the same equipment rack, or possibly a different equipment rack, that is configured to provide more main memory or higher processing speed. However, the increase in throughput realized by migration of the two workloads may be offset as a result of increased network latency being incurred due to the third server being further away from the server hosting the database.

Certain aspects of the invention likewise reflect an appreciation that the complexity of such IT environments generally grows in proportion to the number of data center assets that are being monitored and managed. Likewise, certain aspects of the invention reflect an appreciation that visualizing the current topology of individual components within a large IT environment can be challenging. Furthermore, difficulty in achieving such visualizations may introduce complexities in identifying, and remediating, system performance and network latency issues. Accordingly, certain aspects of the invention reflect an appreciation that the more quickly such issues can be identified and resolved will likely lead to higher quality of service levels and user satisfaction.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142.

In certain embodiments, the data center monitoring and management console 118 may include a monitoring module 120, a management module 122, and a user interface engine 124, or a combination thereof. In certain embodiments, the data center monitoring and management console 118 may be implemented to perform a data center monitoring and management operation. In certain embodiments, the data center monitoring and management operation may be performed during operation of an information handling system 100. In various embodiments, performance of the data center monitoring and management operation may result in the realization of improved monitoring and management of certain data center assets, as described in greater detail herein.

Figure 2:
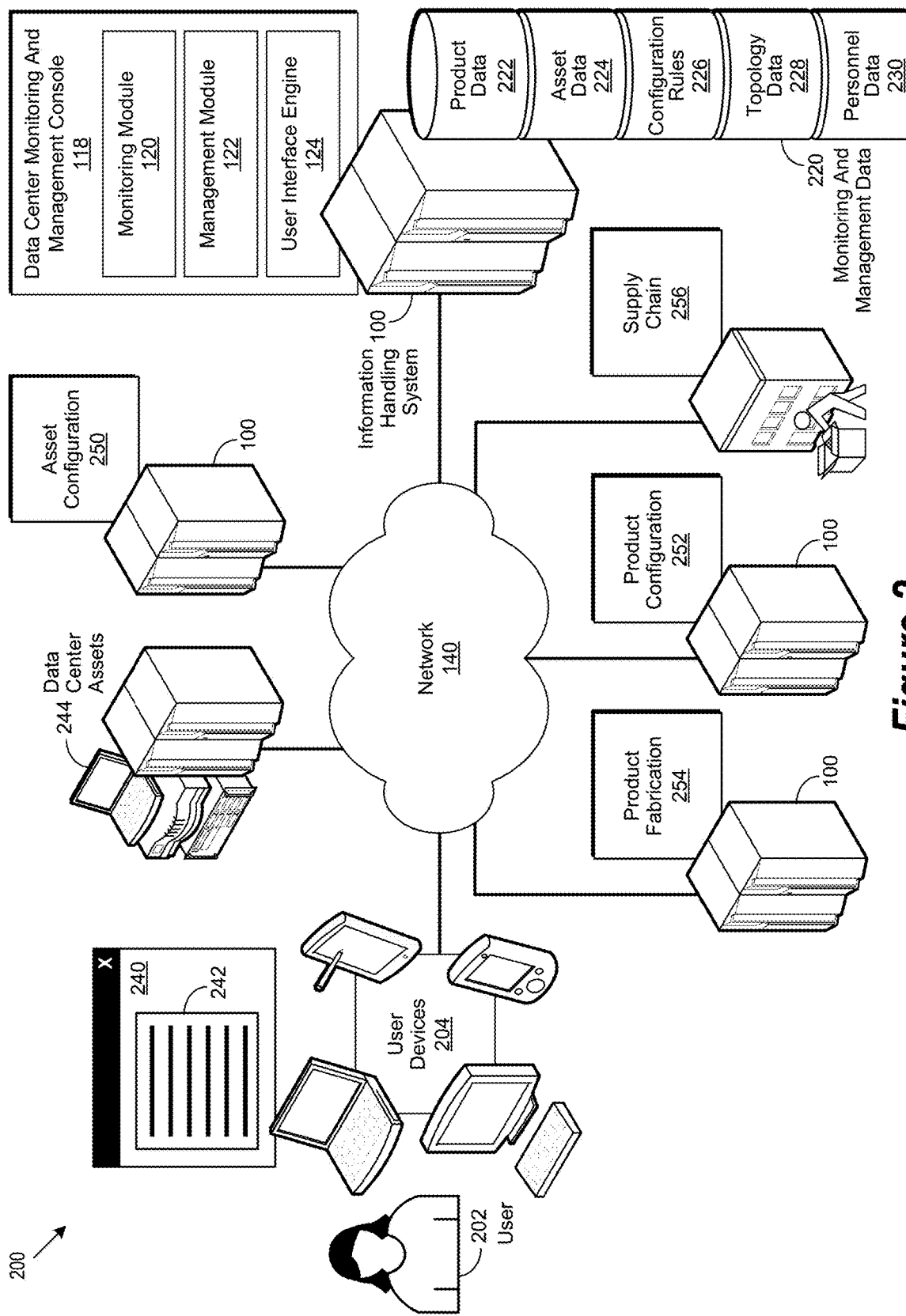
FIG. 2 shows a simplified block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything tangible, or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth.

As likewise used herein, an intangible data center asset 244 broadly refers to a data center asset 244 that lacks physical substance. Examples of intangible data center assets 244 may include software, firmware, and other non-physical, computer-based assets. Other examples of intangible data center assets 244 may include digital assets, such as structured and unstructured data of all kinds, still images, video images, audio recordings of speech, and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, individual data center assets 244 may be implemented in a data center according to a particular data center asset topology. As used herein, a data center asset topology broadly refers to the spatial relationship between certain data center assets 244 and their associated network interconnections. In certain embodiments, a data center asset topology may include a data center physical topology, or a data center network topology, or both. As used herein, a data center physical topology broadly refers to the physical location, placement, arrangement, and configuration of individual data center assets 244 implemented within a data center.

As likewise used herein, a data center network (DCN) topology broadly refers to the structure and routing of network connections between individual data center assets 244 implemented within a data center. Certain embodiments of the invention reflect an appreciation that a DCN topology is typically designed to be both scalable and efficient, as it is not uncommon for it to connect tens or even hundreds of thousands of data center assets 244 to one another. Accordingly, various embodiments of the invention reflect an appreciation that the efficiency of data center assets 244 working in combination with one another may be dependent upon the topology of a DCN.

In various embodiments, a DCN topology may be implemented to define certain physical or logical topological aspects of an associated DCN, or both. In certain embodiments, the physical and logical topologies of a particular DCN may be the same or different. In certain embodiments, a DCN topology may be implemented as a point-to-point, bus, star, ring, mesh, tree, daisy chain, or hybrid topology. In certain embodiments, a DCN may be implemented as a tree-based topology, familiar to skilled practitioners of the art. In certain embodiments a DCN topology may be implemented as a three-tier DCN, likewise familiar to those of skill in the art, that includes an access layer, an aggregate layer, and a core layer. In certain embodiments, a DCN topology may be implemented where one server hub is connected to many other servers, or where different servers are cross-linked, or cross-indexed, to one another, or a combination thereof, to provide various types of functionality.

In certain embodiments, a data center physical topology and a DCN topology may be combined to provide a unionized data center topology. As used herein, a unionized data center topology broadly refers to a unified representation of a particular data center physical topology and its associated DCN topology. In certain embodiments, the unionized data center topology may be implemented as a data center asset topology map. In certain embodiments, the data center asset topology map may be implemented to show the correlation between certain data center assets 244 and an associated DCN topology. In certain embodiments, the data center physical topology, or the DCN topology, or the unionized data center topology, or the data center asset topology map, or a combination thereof, may be presented as a graphical representation 242 within a user interface (UI) 240 or the data center monitoring and management console 118.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, operation, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment task, a data center remediation task, or a combination of the two. As used herein, a data center deployment task broadly refers to any function, operation, procedure, or process performed, directly or indirectly, within a data center monitoring and management environment 200 to install a software file, such as a configuration file, a new software application, a version of an operating system, and so forth, on a data center asset 244. As likewise used herein, a data center remediation task broadly refers to any function, operation, procedure, or process performed, directly or indirectly, within a data center monitoring and management environment 200 to correct an operational situation associated with a particular data center asset 244 that may result in negative consequences.

In certain embodiments, the data center monitoring and management environment 200 may be implemented to include a data center monitoring and management console 118, an asset configuration system 250, a product configuration system 252, a product fabrication system 254, and a supply chain system 256, or a combination thereof. In certain embodiments, the data center monitoring and management console 118 may be implemented to include a monitoring module 120, a management monitor 122, and a user interface (UI) engine 124, or a combination thereof.

In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244, at any point in its lifecycle. In various embodiments, the UI engine 124 may be implemented to generate a UI for the provision, or receipt, of certain information associated with the monitoring, or management, of a particular data center asset 244.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with product data 222, data center asset data 224, data center asset configuration rules 226, data center topology data 228, and data center personnel data 230.

As used herein, product data 222 broadly refers to information associated with a product, such as an information handling system 100, which can be read, measured, and structured into a usable format. For example, product data 222 associated with a particular server may include the number and type of processors it can support, their speed and architecture, minimum and maximum amounts of memory supported, various storage configurations, the number, type, and speed of input/output channels and ports, and so forth. In various embodiments, the product data 222 may likewise include certain performance and configuration information associated with a particular workload, as described in greater detail herein. In various embodiments, the product data 222 may include certain public or proprietary information related to data center asset 244 configurations associated with a particular workload.

As used herein, data center asset data 224 broadly refers to any information associated with a data center asset 244, described in greater detail herein. In certain embodiments, the data center asset data 224 may include information associated with data center asset 244 types, quantities, locations, use types, optimization types, workloads, performance, support information, and cost factors, or a combination thereof, as described in greater detail herein. In certain embodiments, the data center asset data 224 may include information associated with data center asset 244 utilization patterns, likewise described in greater detail herein.

As likewise used herein, a data center asset configuration rule 226 broadly refers to a rule used to configure a particular data center asset 244. In certain embodiments, one or more data center asset configuration rules 226 may be used to verify that a particular data center asset 244 configuration is the most optimal for an associated location, or workload, or a combination of the two, as described in greater detail herein. In certain embodiments, the data center asset configuration rule 226 may be used in the performance of an data center asset configuration verification operation. In certain embodiments, the data center asset verification operation may be performed by an asset configuration system 250.

As used herein, data center topology 228 data broadly refers to any data associated with a data center topology, described in greater detail herein. In various embodiments, the data center topology 228 data may include certain data center infrastructure component data. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. Examples of data center infrastructure components include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. Other examples of data center infrastructure components include the provision of certain services, such as network connectivity, conditioned airflow, electrical power, and water, or a combination thereof.

Data center personnel data 230, as used herein, broadly refers to any data associated with personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain personnel. In various embodiments, the data center personnel data 230 may likewise include education, certification, and skill level information corresponding to certain personnel. Likewise, in various embodiments, the data center personnel data 230 may include security-related information, such as security clearances, user IDs, passwords, security-related biometrics, authorizations, and so forth, corresponding to certain personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center asset management environment 200 may have certain interdependencies. As an example, a data center asset management environment 200 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform a sales analysis of sales associated with those same customer records.

In certain embodiments, each data center asset 244 in a data center monitoring and management environment 200 may have an associated maintenance schedule and service contract. For example, a data center asset management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules. In certain of these embodiments, the data center asset configuration rules may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of communicating and processing data. In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center asset management console 118. In certain embodiments, the UI engine 124 may be implemented to generate the data center monitoring and management console UI 240, or the graphical representation 242 presented therein, or both.

In certain embodiments, the user device 204 may be used to exchange information between the user 202 and the data center monitoring and management console 118, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input to a web server.

In certain embodiments, the data center asset management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center asset management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
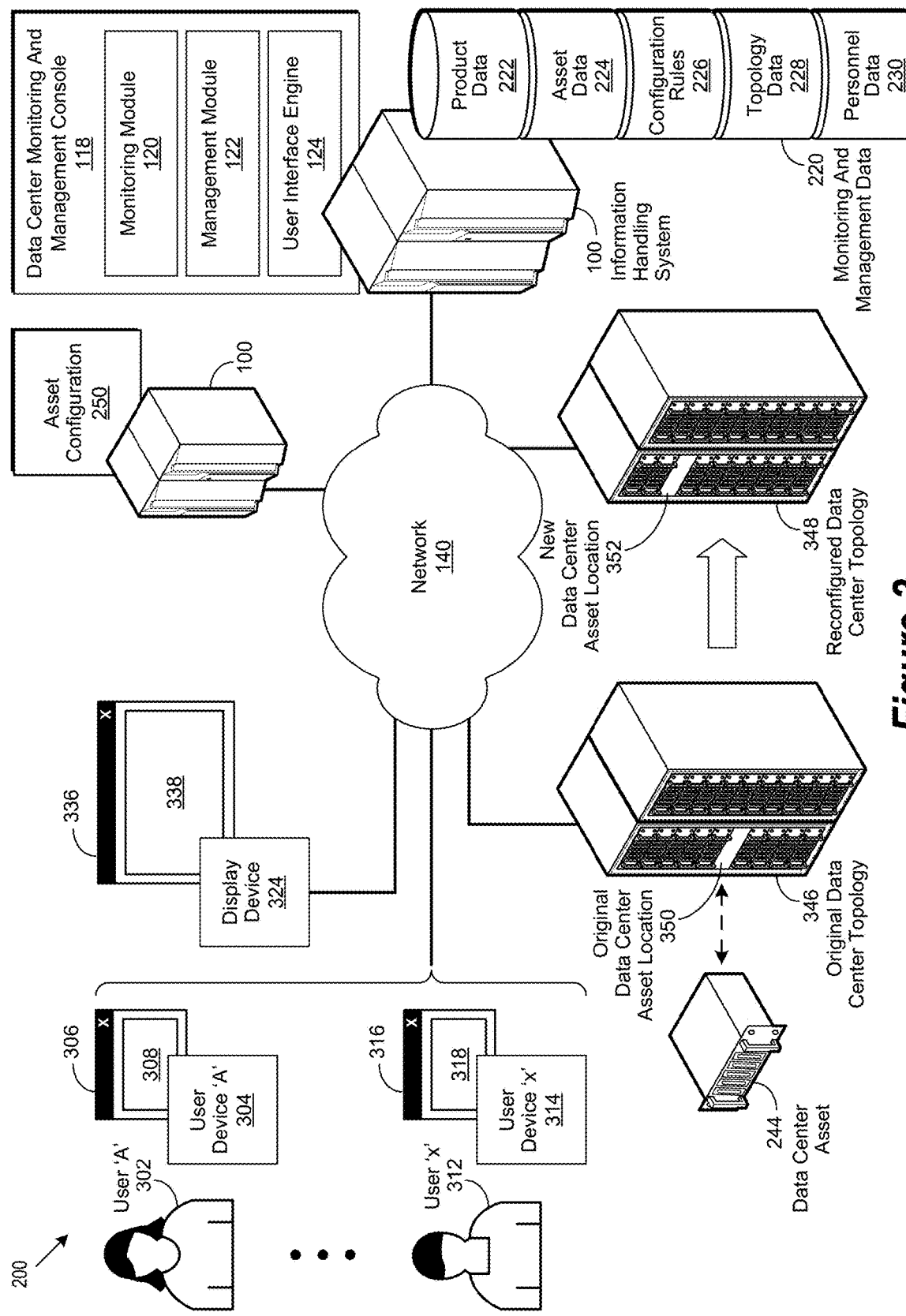
FIG. 3 shows a functional block diagram of the performance of a data center monitoring and management operation.

FIG. 3 shows a functional block diagram of the performance of a data center monitoring and management operation implemented in accordance with an embodiment of the invention. In various embodiments, a data center monitoring and management environment 200, described in greater detail herein, may be implemented to include one or more data center topologies. In various embodiments, certain data center assets 244 may be implemented in an original data center topology 346. In certain embodiments, as described in greater detail herein, the original data center topology 346 may reconfigured, or otherwise altered, to create a reconfigured data center topology 348.

As described in greater detail herein, each of original data center topologies 346 and reconfigured data center topologies 348 may be implemented to include one or more data center assets 244, likewise described in greater detail herein. In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, and a user interface (UI) engine 124, or a combination thereof, as described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In certain embodiments, users 'A' 302 through 'x' 312 may respectively interact with the data center monitoring and management console 118, and other components of the data center monitoring and management environment 200, through the use of an associated user device 'A' 304 through 'x' 314. In certain embodiments, such interactions may be respectively presented to users 'A' 302 through 'x' 312 within a user interface (UI) window 306 through 316, corresponding to user devices 'A' 304 through 'x' 314.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 338 within a UI window 336.

In certain embodiments, the data center monitoring and management operation may be performed to identify the original location 350 of a particular data center asset 244 in an original data center topology 346, or its new location 352 in a reconfigured data center topology 348. In certain embodiments, the location 350, 352 of a data center asset 244 may be physical, such as the physical address of its associated data center, a particular room in a building at the physical address, a particular location in an equipment rack in that room, and so forth. In certain embodiments, the location 350, 352 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention likewise reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that the number of data center assets 244 in a particular data center may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350, 352 in a particular data center, and implementing it in that location 350, 352. The same, or another, data center technician may then be responsible for configuring the data center asset 244, establishing network connectivity, applying configuration files, and so forth.

To continue the example, the same, or another, data center technician may be responsible for remediating hardware issues, such as replacing a disc drive in a server or Redundant Array of Independent Disks (RAID) array, or software issues, such as updating the OS version on a server. Likewise, the data center technician may be responsible for changing the location 350, 352 of a particular data center asset 244, or reconfiguring its network connection(s) to other data center assets 244, as described in greater detail herein. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center asset topology efficiency improvement operation. As used herein, a data center asset topology efficiency improvement operation broadly refers to any task, function, procedure, or process performed, directly or indirectly, within a data center monitoring and management environment 200 to change the topology of a particular group of data center assets to improve their efficiency. In certain embodiments, data center asset traffic efficiency improvement operations may be begun by identifying a target group of data center assets 244. A data center topology map, described in greater detail herein, of the target group of data center assets is then generated and presented within a UI window 306 through 316, or 318, of a data center monitoring and management system 118, described in greater detail herein.

Target data center asset 244 traffic parameters, likewise described in greater detail herein, are then selected for each of the data center assets 244. In certain embodiments, the target data center asset 244 traffic parameters may be displayed, or selected, or both, within the UI 306 through 316, or 318, of the data center monitoring and management system 118. Ongoing monitoring of data center asset 244 traffic and collection of associated metrics is then performed. As used herein, data center asset 244 traffic broadly refers to DCN traffic between two or more associated data center asset 244. In certain embodiments, the data center asset 244 traffic metrics collected may include information associated with a DCN traffic source, a DCN traffic destination, DCN bandwidth, and DCN latency, or a combination thereof.

The resulting data center asset 244 traffic metrics are then presented within the UI 306 through 316, or 336, of the data center monitoring and management system 118, along with the data center topology map and the previously-selected data center asset traffic 244 parameters. In certain embodiments, the resulting data center asset 244 traffic metrics, the data center topology map, and the previously-selected data center asset traffic 244 parameters, or a combination thereof, may be respectively presented as graphical representations 308 through 318, or 338, within UIs 306 through 316, or 336. A determination is then made whether any of the previously-selected data asset traffic parameters have been exceeded. If so, then data center topology efficiency improvement operations are performed and associated data center topology efficiency improvement recommendations are provided within the UI 306 through 316, or 336, of the data center monitoring and management system 118.

In certain embodiments, the data center topology efficiency improvement recommendation may be to reallocate workloads across data center assets 244. If so, then workloads are reallocated across data center assets 244, using workload reallocation approaches familiar to skilled practitioners of the art. In various embodiments, certain machine learning approaches, likewise familiar to those of skill in the art, may be used to determine the most advantageous reallocation of workloads across data center assets 244.

In certain embodiments, the data center topology efficiency improvement recommendation may be to reconfigure data center assets 244 in the data center physical topology. If so, then certain data center assets 244 in the data center physical topology are reconfigured. In various embodiments, the reconfiguration of the data center physical topology may be achieved by physically relocating certain data center assets 244 from one location to another. As an example, as described in greater detail herein, servers within a particular data center asset equipment rack may be rearranged such that certain servers are more proximate to one another, and as a result, DCN latency is reduced when they exchange information with one another.

In certain embodiments, the data center topology efficiency improvement recommendation may be to reconfigure the DCN topology. If so, then the DCN topology is reconfigured. In certain embodiments, the reconfiguration of the DCN topology may be physical, such as rerouting DCN connections to use shorter lengths of network cable, or reducing the number of DCN hops or switch layers. In certain embodiments, the reconfiguration of the DCN topology may be performed virtually, such as by adjusting routing algorithms for certain circuits within the DCN. In certain embodiments, the data center topology efficiency improvement recommendation may be to perform other data center topology efficiency improvement operations, such as changing certain operating parameters of one or more data center assets.

Figure 4:
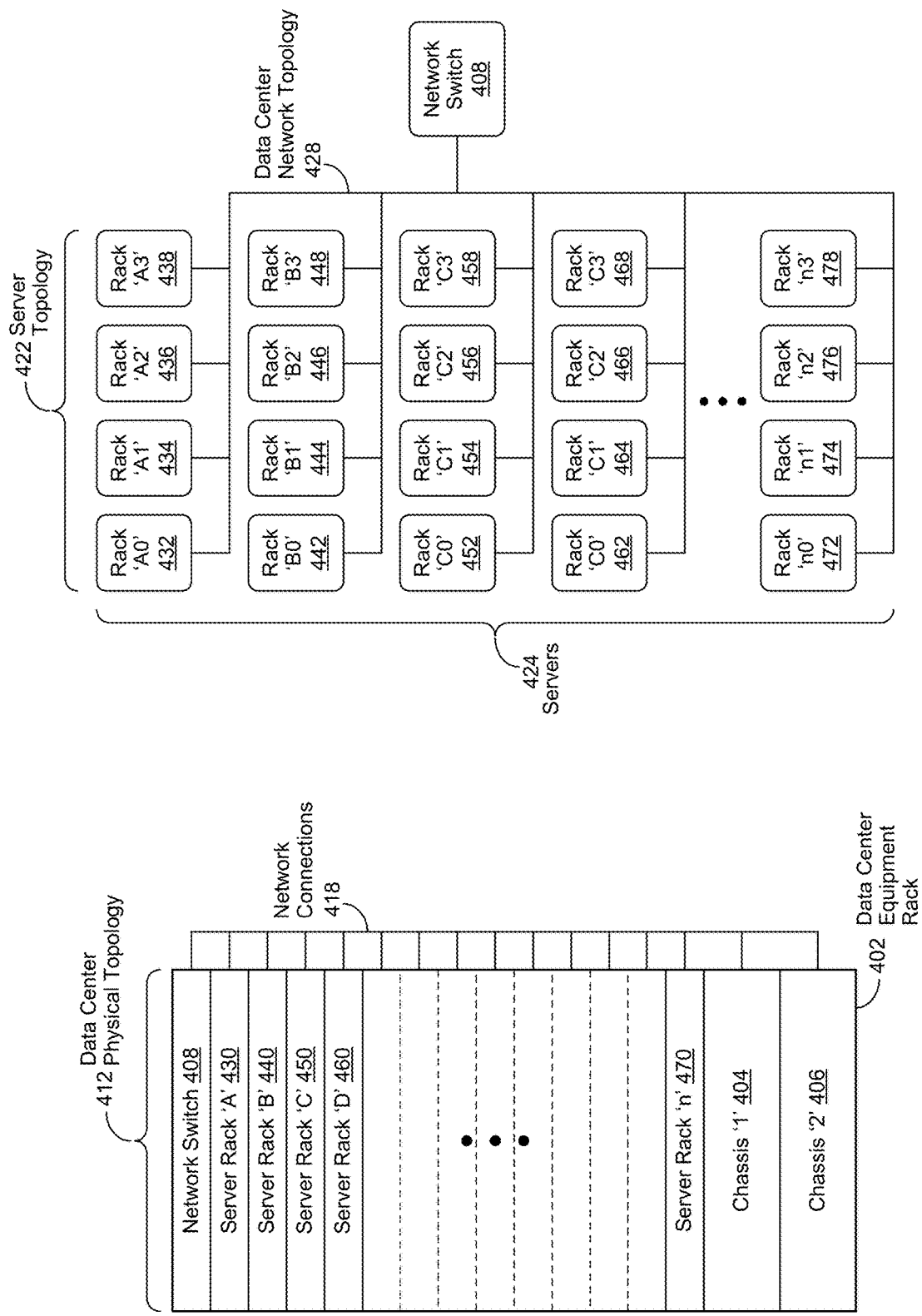
FIGS. 4a and 4b show a simplified block diagram of a data center asset physical topology and an associated data center network (DCN) topology.

FIGS. 4a and 4b show a simplified block diagram of a data center asset physical topology, and an associated data center network (DCN) topology, implemented in accordance with an embodiment of the invention. Various embodiments of the invention reflect an appreciation that many data centers have clusters of data center assets, such as servers, that work together to complete certain tasks. Certain embodiments of the invention likewise reflect an appreciation that such clusters of data center assets are often implemented according a particular data center physical topology 412 within a corresponding data center equipment rack 402. For example, the data center physical topology 412 of the data center equipment rack 402 shown in FIG. 4a includes equipment rack chassis '1' 404 and '2' 406, a network switch 408, and server racks 'A' 430, 'B' 440, 'C' 450, and 'D' 460 through 'n' 470.

Certain embodiments of the invention reflect an appreciation that such data center assets are typically connected to one another by one or more associated network connections 418. Certain embodiments of the invention likewise reflect an appreciation that such network connections 418 are typically provided via a set of wires, such as a cat-6 Ethernet cable familiar to skilled practitioners of the art. Likewise, certain embodiments or the invention reflect an appreciation that two or more layers of network switches 408 may be implemented to expand the number of concurrent network connection 418. Certain embodiments of the invention reflect an appreciation that the number of concurrent network connections 418 and network switches 408 can proliferate in a large data center. Certain embodiments of the invention likewise reflect an appreciation that such proliferation can result in complexity, lead to incurred infrastructure cost, and increase network latency, or a combination thereof.

Referring now to FIG. 4b, certain embodiments of the invention reflect an appreciation that it is common for a particular server rack 'A' 430, 'B' 440, 'C' 450, and 'D' 460 through 'n' 470 to house one or more servers 424. In certain embodiments, these servers 424 may be placed in a particular server rack 'A' 430, 'B' 440, 'C' 450, and 'D' 460 through 'n' 470 according to an associated server topology 422. For example, as shown in FIG. 4b, server rack 'A' 430 may be implemented contain servers 424 in rack positions 'A0' 432, 'A1' 434, 'A2' 436, and 'A3' 438.

To continue the example, server rack 'B' 440 may be implemented contain servers 424 in rack positions 'B0' 442, 'B1' 444, 'B2' 446, and 'B3' 448. To continue the example further, server rack 'C' 450 may be implemented contain servers 424 in rack positions 'C0' 452, 'C1' 454, 'C2' 456, and 'C3' 458. In further continuance of the example, server rack 'D' 460 may be implemented contain servers 424 in rack positions 'D0' 462, 'D1' 464, 'D2' 466, and 'D3' 468. Likewise server rack 'n' 470 may be implemented contain servers 424 in rack positions 'n0' 472, 'n1' 474, 'n2' 476, and 'n3' 478.

In certain embodiments, the server topology 422 may be implemented as a subset of an associated data center physical topology 412. In various embodiments, the individual servers 424 contained in server racks 'A' 430, 'B' 440, 'C' 450, and 'D' 460 through 'n' 470 may be interconnected to one another via a network switch 408. In certain of these embodiments, such interconnections may be made according to a particular Data Center Network (DCN) topology 428, described in greater detail herein.

Figure 5:
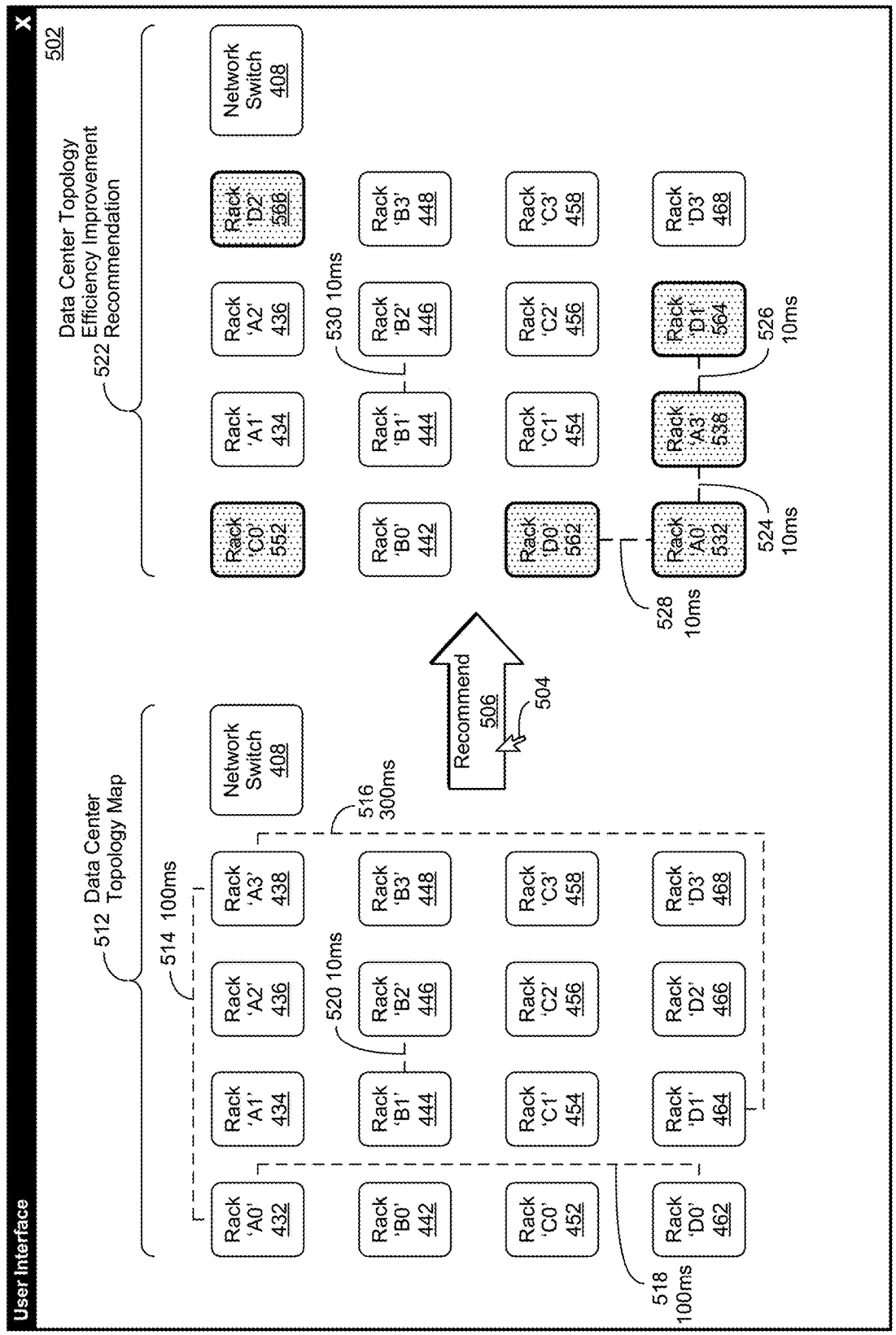
FIG. 5 shows an example screen presentation of a data center asset traffic efficiency improvement optimization operation.

FIG. 5 shows an example screen presentation of a data center asset traffic efficiency improvement recommendation implemented in accordance with an embodiment of the invention. In certain embodiments, as described in greater detail herein, a data center topology map 512 may be graphically represented within a User Interface (UI) widow 502 of a data center monitoring and management system. For example, as shown in FIG. 5, the data center topology map 512 presents a graphical representation of servers in rack positions 'A0' 432, 'A1' 434, 'A2' 436, 'A3' 438, 'B0' 442, 'B1' 444, 'B2' 446, 'B3' 448, 'C0' 452, 'C1' 454, 'C2' 456, 'C3' 458, 'D0' 462, 'D1' 464, 'D2' 466, and 'D3' 468, as well as network switch 408, in the UI window 502.

In certain embodiments, as likewise described in greater detail herein, data center asset traffic may be monitored and associated metrics collected. In various embodiments certain data center asset traffic metrics may likewise be presented within the UI window 502. For example, the latency 514 between the servers located at rack position 'A0' 432 and the server located at rack position 'A3' 438, and the latency 518 between the server located at rack position 'A0' 432 and the server located at rack position 'D0' 462 are both indicated to be 100 ms. To continue the example, the latency 520 between the server located at rack position 'B1' 444 and the server located at rack position 'B2' 446 is indicated be 10 ms., while the latency 516 between the server located at rack position 'A3' 438 and the server located at rack position 'D1' 464 is to be 300 ms.

In various embodiments, as described in greater detail herein, certain data center topology efficiency improvement operations may be performed to generate a data center topology efficiency improvement recommendation 522. In certain embodiments, the performance of the data center topology efficiency improvement operations may be initiated as a result of a user gesture, such as a mouse click with cursor 504 on a corresponding "Recommend" control button 506, within the UI 502. In certain embodiments, the resulting data center topology efficiency improvement recommendation 522 may then be graphically represented within the UI 502.

For example, the data topology efficiency improvement recommendation 522 shown in FIG. 5 may provide a suggestion to move the server previously located in rack position 'A0' 432 to rack position 'A0' 532, which is where a server was previously located in rack position 'D0' 462. Likewise, the server previously located in rack position 'D0' 462 is suggested to be relocated to rack position 'D0' 562, which is where a server was previously located in rack position 'C0' 452. To continue the example, the server previously located in position 'A3' 438 is suggested to be relocated to rack position 'A3' 538, which is where a server was previously located in rack position 'D1' 464. Likewise, the server previously located in rack position 'D1' 464 is suggested to be relocated to rack position 'D1' 564, which is where a server was previously located in position 'D2' 466.

To further continue the example, the server previously located in position 'D0' 462 is suggested to be relocated to rack position 'D0' 562, which is where a server was previously located in rack position 'C0' 452. Likewise, the server previously located in rack position 'C0' 452 is suggested to be relocated to rack position 'C0' 552, which is where a server was previously located in position 'A0' 432. To continue the example yet further, data center topology efficiency improvement recommendation 522 displayed in the UI 502 may likewise be implemented to show relocating servers to new rack positions 'D0' 562, 'A0 532, 'A3' 538, and 'D1' 564 may reduce the latency of their DCN connections to adjacent servers to 10 ms.

Figure 6A:
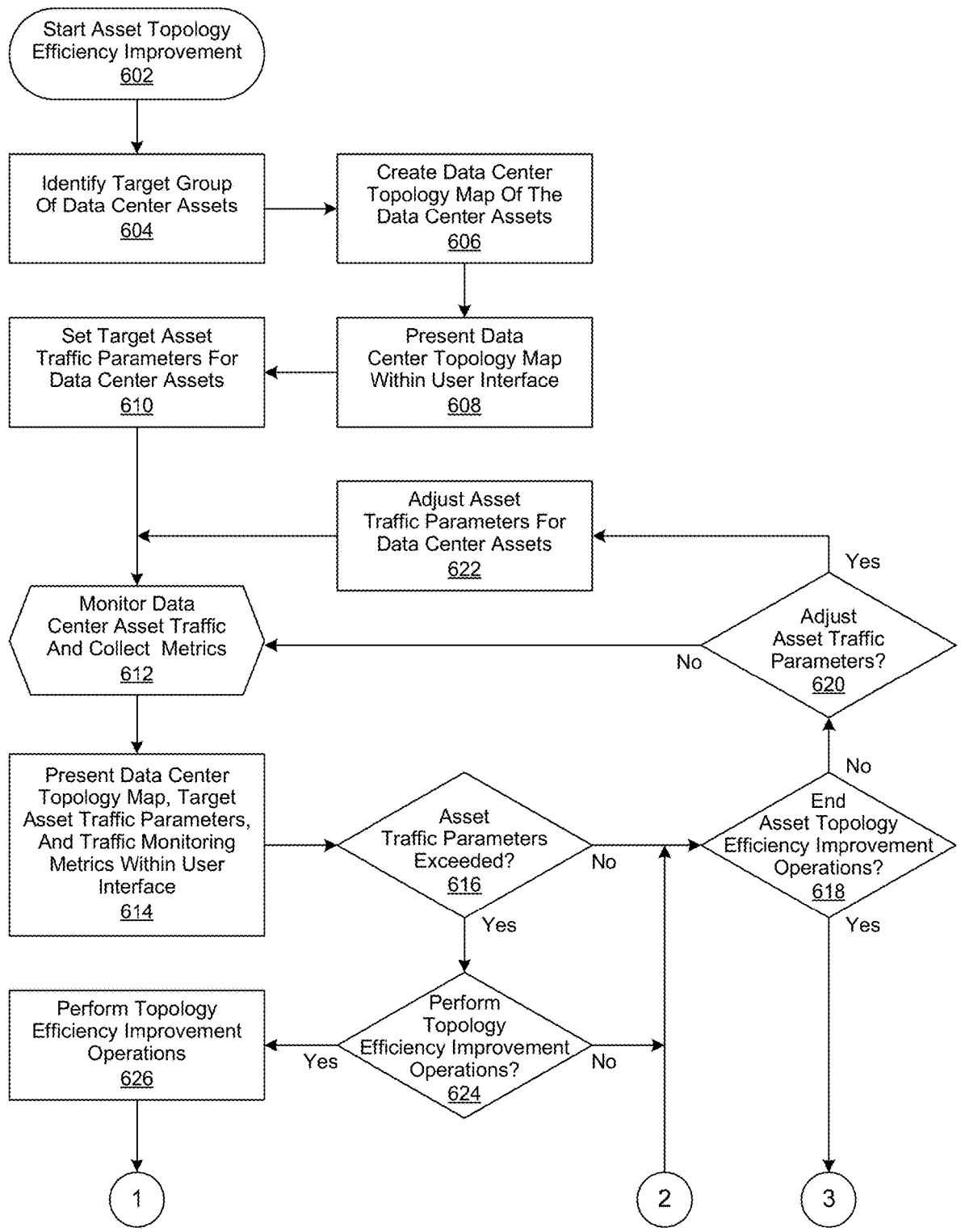
FIGS. 6a and 6b show a flowchart of the performance of a data center asset topology efficiency improvement recommendation.
Figure 6B:
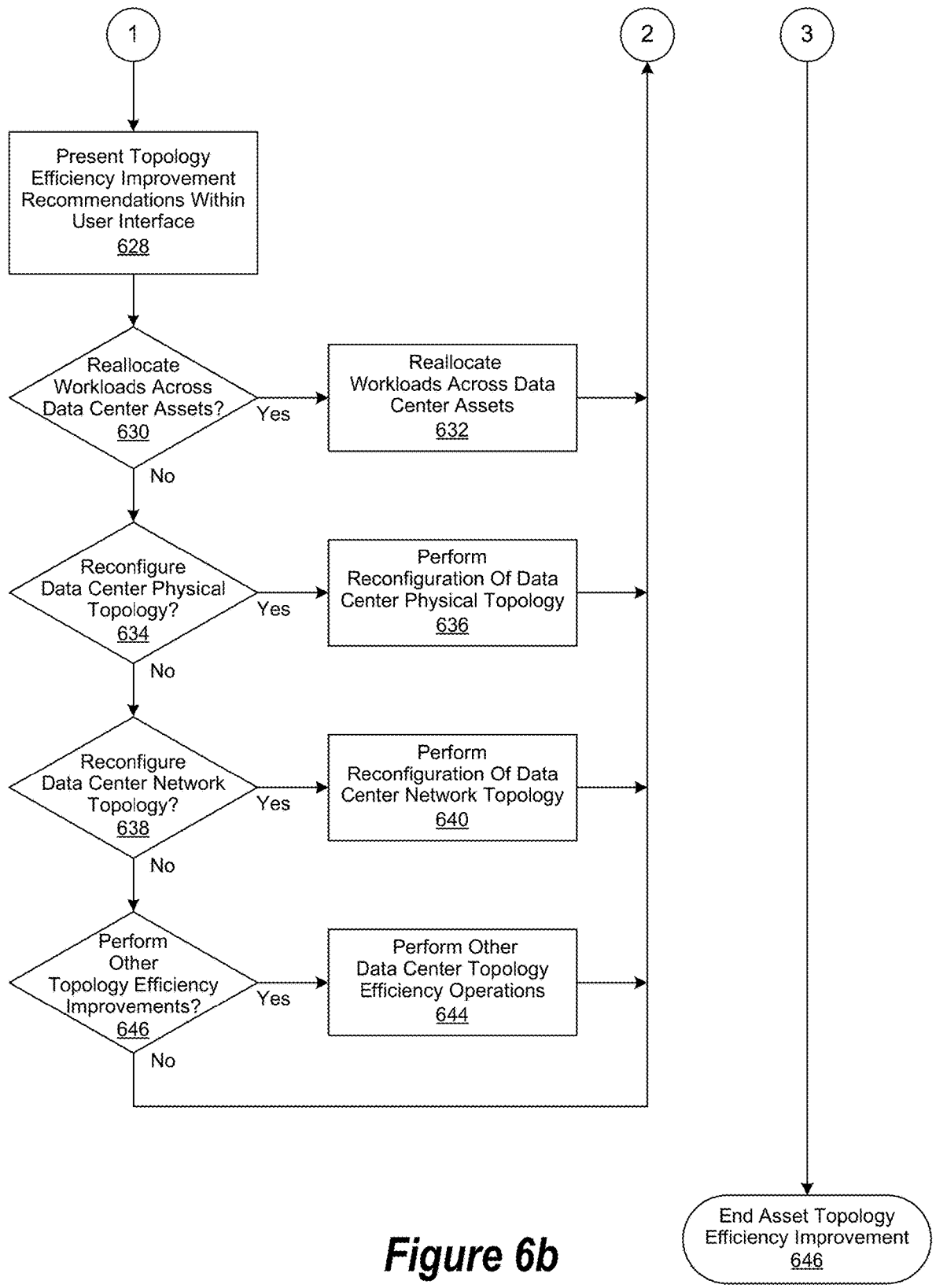

FIGS. 6a and 6b show a flowchart of the performance of a data center asset topology efficiency improvement operations implemented in accordance with an embodiment of the invention. In this embodiment, data center asset traffic efficiency improvement operations are begun in step 602, followed by identifying a target group of data center assets in step 604. A data center topology map, described in greater detail herein, of the target group of data center assets is then generated in step 606. Once the data center topology map is generated, it is then presented in step 608 within a User Interface (UI) window of a data center monitoring and management system, described in greater detail herein. Then, in step 610, target data center asset traffic parameters, likewise described in greater detail herein, are then selected for each of the data center assets in step 608. In certain embodiments, the target data center asset traffic parameters may be displayed, or selected, or both, within the UI of the data center monitoring and management system.

Ongoing monitoring of data center asset traffic and collection of associated metrics is then performed in step 612. The resulting data center asset traffic metrics are then presented within the UI of the data center monitoring and management system in step 614, along with the data center topology map and the previously-selected data center asset traffic parameters. A determination is then made in step 616 whether any of the previously-selected data asset traffic parameters have been exceeded. If not, then a determination is made in step 618 whether to end data center asset topology efficiency improvement operations. If so, then data center asset topology efficiency improvement operations are ended in step 646.

If not, then a determination is then made in step 620 whether to adjust the settings of any of the target data center asset traffic parameters. If so, then they are selected and adjusted accordingly in step 622, and the process is continued, proceeding with step 612. Otherwise, they are not adjusted and the process is continued, proceeding with step 612. However, if it was determined in step 616 that the previously-selected data asset traffic parameters have not been exceeded, then a determination is made in step 624 whether to perform data center asset topology efficiency improvement operations. If not, then the process is continued, proceeding with step 618. Otherwise data center topology efficiency improvement operations are performed in step 620 and associated data center topology efficiency improvement recommendations are provided within the UI of the data center monitoring and management system in step 628.

A determination is then made in step 630 whether to reallocate workloads across data center assets. If so, then workloads are reallocated across data center assets in step 632, and the process is continued, proceeding with step 618. Otherwise, a determination is made in step 634 whether to reconfigure data center assets in the data center physical topology. If so, then certain data center assets in the data center physical topology are reconfigured in step 636, and the process is continued, proceeding with step 618. Otherwise, a determination is made in step 638 whether to reconfigure the data center network topology. If so, then the data center network topology is reconfigured in step 640, and the process is continued, proceeding with step 618. Otherwise, a determination is made in step 646 whether to perform other data center topology efficiency improvement operations. If so, then they are performed in step 644, and the process is continued, proceeding with step 618. Otherwise, no other data center topology efficiency improvement operations are performed, and the process is continued, proceeding with step 618.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center monitoring and management operation, comprising:
    identifying a data center asset topology for a data center;
    creating a data center topology map;
    monitoring asset traffic within the data center, the monitoring providing data center asset traffic data;
    presenting the data center topology map within data center topology user interface;
    presenting an efficiency improvement suggestion associated with the asset traffic within the data center; and,
    changing the data center asset topology based upon the efficiency improvement suggestion.

2. The method of claim 1, wherein:
    the data center asset topology comprises at least one of a data center network topology and a data center physical topology.

3. The method of claim 2, wherein:
    the data center asset topology comprises a unionized data center topology, the unionized data center topology comprising the data center network topology and the data center physical topology.

4. The method of claim 1, wherein:
the data center asset traffic data comprises associated network traffic information, the network traffic information comprising information associated with a network traffic source, a network traffic destination, network bandwidth and network latency.

5. The method of claim 1, wherein:
the monitoring asset traffic within the data center topology is performed via a data center monitoring system.

6. The method of claim 1, wherein:
the creating the data center asset topology map comprises correlating a network with specific data center assets within the data center asset topology.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
identifying a data center asset topology for a data center;
creating a data center topology map;
monitoring asset traffic within the data center, the monitoring providing data center asset traffic data;
presenting the data center topology map within data center topology user interface;
presenting an efficiency improvement suggestion associated with the asset traffic within the data center; and,
changing the data center asset topology based upon the efficiency improvement suggestion.

8. The system of claim 7, wherein:
the data center asset topology comprises at least one of a data center network topology and a data center physical topology.

9. The system of claim 8, wherein:
the data center asset topology comprises a unionized data center topology, the unionized data center topology comprising the data center network topology and the data center physical topology.

10. The system of claim 7, wherein:
the data center asset traffic data comprises associated network traffic information, the network traffic information comprising information associated with a network traffic source, a network traffic destination, network bandwidth and network latency.

11. The system of claim 7, wherein:
the monitoring asset traffic within the data center topology is performed via a data center monitoring system.

12. The system of claim 7, wherein:
the creating the data center asset topology map comprises correlating a network with specific data center assets within the data center asset topology.

13. A non-transitory, computer-readable storage medium embodying computer program code, the computer program code comprising computer executable instructions configured for:
identifying a data center asset topology for a data center;
creating a data center topology map;
monitoring asset traffic within the data center, the monitoring providing data center asset traffic data;
presenting the data center topology map within data center topology user interface;
presenting an efficiency improvement suggestion associated with the asset traffic within the data center; and,
changing the data center asset topology based upon the efficiency improvement suggestion.

14. The non-transitory, computer-readable storage medium of claim 13, wherein:
the data center asset topology comprises at least one of a data center network topology and a data center physical topology.

15. The non-transitory, computer-readable storage medium of claim 14, wherein:
the data center asset topology comprises a unionized data center topology, the unionized data center topology comprising the data center network topology and the data center physical topology.

16. The non-transitory, computer-readable storage medium of claim 15, wherein:
the data center asset traffic data comprises associated network traffic information, the network traffic information comprising information associated with a network traffic source, a network traffic destination, network bandwidth and network latency.

17. The non-transitory, computer-readable storage medium of claim 13, wherein:
the monitoring asset traffic within the data center topology is performed via a data center monitoring system.

18. The non-transitory, computer-readable storage medium of claim 13, wherein:
the creating the data center asset topology map comprises correlating a network with specific data center assets within the data center asset topology.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *